3,684,466
ORGANIC POLYMER BONDED TUMBLING CHIP
Joseph V. Petrone, 337 Lake St.,
Shrewsbury, Mass. 01545
No Drawing. Filed Jan. 28, 1971, Ser. No. 110,672
Int. Cl. C08g 51/12
U.S. Cl. 51—298                                    3 Claims

ABSTRACT OF THE DISCLOSURE

More durable thermoset organic polymer bonded tumbling chips are created by the incorporation in the thermoset organic polymer of certain quantities of granulated or pulverized thermoplastic polymers.

BACKGROUND OF THE INVENTION

The invention relates to barrel and vibratory finishing processes commonly used to de-burr or impart a desired finish on metal or plastic parts. More particularly the invention relates to an improved tumbling chip to be used in such finishing operations.

The present technology of barrel and vibratory finishing utilizes tumbling chips in an almost infinite variety of shapes. Some of the more popular shapes are shown in U.S. Letters Pat. 2,978,850 issued to K. M. Gleszer. These include discs, triangles, pyramids, truncated cones, spheres, various rods, plates, cubes, and hexagonally shaped chips. In addition to these formal shapes is the so-called random shape. As its name suggests, the so-called random shaped chip has no regular geometric configuration.

With respect to composition there are basically four different types of tumbling media currently used for barrel finishing. The oldest, although perhaps not the most widely used at present, is the random shaped unbonded chips which are nothing more than grains or pebbles of such naturally occurring materials as granite, flint and the like. A second type of tumbling chip is that comprised of abrasive grains bonded together by a vitrified bond. A third type, which may be considered as intermediate between the random shaped media formed from a naturally occurring material and the vitrified bonded chips, is the sintered tumbling chip. The sintered chips are essentially self-bonded e.g. powdered bauxite, preformed to the desired geometric shape, and fired to cause a sintering of said bauxite particles. Still another type of tumbling medium is the thermoset organic polymer bonded species. Organic polymer bonded tumbling chips are comprised of abrasive particles bonded together, generally into some formal geometric shape, by a thermoset organic polymer such as an epoxy, unsaturated polyester, or phenol-formaldehyde condensation polymer. It is this latter type of chip with which the invention is particularly concerned.

An example of an organic polymer bonded tumbling medium is that disclosed by Bellinger in his U.S. Pat. 3,102,011. Bellinger's tumbling chip consists of abrasive grains bonded into a preferred shape by a thermoset organic polymer selected from the group consisting of epoxy, polyester, and phenol-formaldehyde condensation resin. The resulting chips are lighter in weight than the conventional entirely inorganic type of product described above, and probably as a result of this lighter or lower density the organic polymer of the chips are more durable than the latter types.

The quality of any given tumbling medium can conveniently be described in terms of its ability to remove burrs from, and to impart a desired finish to the metal or plastic parts being processed, and by the durability of the grinding medium, conveniently expressed in terms of hours of useful working life. The finishing properties, i.e. the effect on the part being processed, can be widely varied by virtue of the numerous abrasives available and the latitude in tumbling chip shape. The durability of a particular type of chip in use, is affected to a great degree by the materials which make up the tumbling chip.

SUMMARY OF THE INVENTION

It has been discovered that the durability of thermoset organic polymer bonded tumbling media can be greatly enhanced by incorporation in the abrasive-bond composition of from 5 to 30% by weight of a powdered or granular thermoplastic polymer. The tumbling media composition with which the present invention is primarily concerned, is that defined by the following weight percent composition;

|                              | Percent  |
|------------------------------|----------|
| Abrasive                     | 0 to 75  |
| Organic polymer bond         | 20 to 80 |
| Powdered thermoplastic polymer | 5 to 30 |

The resultant improvement in the durability or working life of the invention tumbling media appears to be dependent on the particle size distribution of the thermoplastic organic polymer additive. In order to facilitate a substantial improvement in the life of the tumbling media the particle size distribution of said thermoplastic must be such that the powdered thermoplastic will pass through a 10 mesh screen and preferably through a 35 mesh screen (U.S. Standard Sieve Series).

Although all thermoset organic polymers are susceptible to improvement by modification with a powdered or granular thermoplastic polymer, the most suitable thermoset polymers are the epoxy resins, unsaturated polyesters, and the phenol-aldehyde condensation resins. Of these three preferred types of thermoset polymers, styrene cross linked unsaturated polyesters are the preferred from both a cost point of view and an ease of fabrication consideration. Applicant believes that virtually any powdered thermoplastic polymer will improve the working life of thermoset polymer bonded tumbling medium. Particularly suitable for this purpose are polyethylene, polytetrafluoroethylene, polypropylene, and polyamide.

The present invention anticipates the utilization, as an abrasive, any granular or particulate material which exhibits abrasive behavior toward the material to be barrel or vibratory finished, abrasiveness being in relative term requiring only that the so-called abrasive be of a harder substance than that which is being abraded. This includes such known abrasive materials as alumina, silicon carbide, alumina-zirconia, zirconia-spinel, mullite, spinel, silica sand, boron nitride, zirconia, diamond, boron carbide, garnet, emery, flint, slate, marble, limestone, and mixtures of these.

The reason for the great improvement in durability of thermoset organic polymer bonded tumbling chips which results from incorporation of powdered or granular thermoplastic organic polymer material, is not completely understood. The presence of a relatively resilient thermoplastic polymer dispersed through a relatively rigid thermoset polymer, suggests that the former has a plasticizing effect on the latter. However, this seemingly obvious theory is negated by the fact that when an unsaturated polyester which has been chemically plasticized viz Polylite 31–830, manufactured by Reichhold Chemical Company, was used as the bond, the resulting tumbling chips exhibited only half the life of chips of the same composition but containing a nonplasticized unsaturated polyester as the bond.

DESCRIPTION OF THE PREFERRED EMBODIMENTS

In the preferred practice of the invention a liquid thermosettable organic polymer system (including catalyst and cross-linking agent), abrasive particles and powdered thermoplastic organic polymer, are blended together in a conventional mixer such as a sigma blade mixer or the like. The mixture is then cast or troweled into a multi-cavity mold and subjected to heat sufficient to cure the thermosettable polymer.

The preferred thermosettable polymer system is a styrene cross-linked aromatic unsaturated polyester resin such as Polylite Polyester Resin 33-001 (manufactured by Reichhold Chemical Company) catalyzed with benzoyl peroxide. A mixture of this liquid polymer system, abrasive, and powdered thermoplastic polymer is a castable mixture and is effectively cured by heating at 150° C.

The optimum heating temperature and time will vary with the particular thermosettable polymer used, the particular catalyst used, and the degree of cure desired in the final product, all of which is well known to those skilled in the art and constitutes no part of the present invention.

The following are examples of chip durability tests, comparing tumbling chips of the invention with the conventional type of chip composed of thermoset unsaturated polyester polymer and abrasive only. Various abrasive-polymer compositions of both conventional and invention type chips, showing the improvement in chip durability which results from the incorporation of the preferred amounts of powdered thermoplastic polymer of the proper particle size. All of the tumbling chips in the subsequent examples were made in the manner described above and all utilized the Polylite 33-001 resin mentioned above, an aromatic unsaturated styrene cross-linked polyester liquid resin, catalyzed with approximately 3% by weight of a mixture of 50% benzoyl peroxide and 50% mixed plasticizers.

Also included within the scope of the present invention is the type of "tumbling chip" which is made up only of organic polymer, i.e. contains no abrasive particles. In some relatively limited tumbling and vibratory finishing operations, the parts to be finished are tumbled or vibrated with a mixture of water, loose abrasive granules, and a polymer chip. This produces a finishing result which is believed to be different than that produced by tumbling with only a liquid and loose abrasive particles, and different from that caused by tumbling with a bond abrasive grit tumbling medium. These abrasive free chips are usually cast shapes made from a thermosettable unsaturated polyester resin. When this kind of tumbling medium is made according to the present invention, the life of the chips is greatly enhanced, as exemplified in Example 2 below.

Example 1

| | Chip formula (parts by weight) | | |
|---|---|---|---|
| | VII | VIII | IX |
| Polyester resin (33-001) | 150 | 150 | 150 |
| Catalyst | 3 | 3 | 3 |
| Silicon carbide (500 mesh and finer) | 100 | 66 | 66 |
| Powdered polyethylene (34 mesh and finer) | | 33 | |
| Powdered polypropylene (10 mesh and finer) | | | 33 |
| Styrene | | 7 | 7 |

One third of a cubic foot of cone shaped tumbling chips having a ¾" diameter base, a ¾" altitude terminating in a ¼" diameter top, made with Formulas VII (20.62 lbs.), VIII (17.59 lbs.) and IX (17.25 lbs.) were tumbled in a high centrifugal force tumbling machine (Harperizer) for one hour. The chip loss through wear was 1.25 lbs., 0.39 lb., and 0.58 lb., respectively.

Example 2

| | Chip formula (parts by weight) | |
|---|---|---|
| | X | XI |
| Polyester resin (33-001) | 100 | 80 |
| Catalyst | 3 | 3 |
| Powdered polyethylene (34 mesh and finer) | | 20 |

Ten triangular tumbling chips having a 1¼" base, ⅝" altitude and ⅝" thickness of the above formulas were placed in separate glass jars along with 20 gms. of 60 grit aluminum oxide and rotated for 24 hours. Chips from Formula X lost 0.37 gm. (0.90%) and chips from Formula XI lost 0.25 gm. (0.57%).

Example 3

| | Chip formula (parts by weight) | | |
|---|---|---|---|
| | XII | XIII | XIV |
| Polyester resin (33-001) | 50 | 50 | 50 |
| Catalyst | 1.5 | 1.5 | 1.5 |
| Quartz (280 mesh and finer) | 50 | 30 | 40 |
| Powdered polyethylene (10 mesh and finer) | | 20 | 10 |
| Styrene | | 5 | 2.5 |

Ten triangular tumbling chips having the same dimensions as those of Example 2 and of the above formulas were placed in separate glass jars along with 20 gms. of 60 grit aluminum oxide and rotated for 24 hours. Chips from Formula XII lost 3.06 gms. (4.98%), from Formula XIII lost 0.89 gm. (1.79%) and from Formula XIV 1.31 gms. (2.40%).

Example 4

| | Chip formula (parts by weight) | | |
|---|---|---|---|
| | XV | XVI | XVII |
| Polyester resin (33-001) | 50 | 50 | 50 |
| Catalyst | 1.5 | 1.5 | 1.5 |
| Quartz (280 grit and finer) | 30 | 30 | 30 |
| Teflon molding powder | | | 20 |
| Polyethylene powder (400 mesh and finer) | | 20 | |
| Nylon powder (34 mesh and finer) | 20 | | |
| Styrene | 10 | 5 | 5 |

Ten triangular tumbling chips having the same dimensions as those of Example 2 and of the above formulas were placed in separate glass jars along with 20 gms. of 60 grit aluminum oxide and rotated for 24 hours. Chips from Formula XV lost .80 gm. (1.55%), from Formula XVI lost .57 gm. (1.16%) and from Formula XVII, lost 1.93 gms. (3.33%).

Example 5

| | Chip formula (parts by weight) | | |
|---|---|---|---|
| | XVIII | XIX | XX |
| Polyester resin (33-001) | 100 | 100 | |
| Flexible polyester resin (31-830) | | | 100 |
| Catalyst | 3 | 3 | 3 |
| Quartz (280 mesh and finer) | 100 | 60 | 100 |
| Powdered polyethylene (10 mesh and finer) | | 40 | |
| Styrene | | 10 | |

One third cubic foot each of triangular shaped tumbling chips having the same dimensions as those of Example 2 and made with Formulas XVIII (19.87 lbs.), XIX (15.71 lbs.), and XX (19.43 lbs.) were tumbled in a rotating barrel for 72 hours. The chip loss through wear was 0.35 lb., 0.08 lb. and .70 lb. respectively.

What is claimed is:

1. A light weight thermoset organic polymer bonded tumbling chip consisting essentially of 20 to 80% by weight of a thermoset organic polymer selected from the group consisting of unsaturated polyester, epoxy, and phenol-aldehyde; 5 to 30% by weight of a powder thermoplastic polymer selected from the group consisting of polyethylene, polypropylene, polytetrafluoroethylene, and polyamide, said thermoplastic polymer being of such a degree of fineness as to pass through a 10 mesh screen; and 0 to 75% by weight of abrasive.

2. The tumbling chip of claim 1 wherein said abrasive is selected from the group consisting of alumina, silicon carbide, alumina-zirconia, zirconia-spinel, mullite, spinel, silica sand, boron nitride, zirconia, diamond, boron carbide, garnet, emery, flint, and mixtures thereof.

3. The tumbling chip of claim 2 wherein said thermoset polymer is an unsaturated polyester.

References Cited

UNITED STATES PATENTS

| | | | |
|---|---|---|---|
| 3,102,011 | 8/1963 | Bellinger | 51—DIG. 30 |
| 3,355,272 | 11/1967 | D'Alessandro | 51—298 |
| 3,504,124 | 3/1970 | Kittredge et al. | 51—164.5 |
| 3,406,020 | 10/1968 | D'Alessandro | 51—298 |
| 3,385,684 | 5/1968 | Voter | 51—298 |

DONALD J. ARNOLD, Primary Examiner

U.S. Cl. X.R.

51—164.5, 313, DIG. 30